(No Model.) 5 Sheets—Sheet 1.
P. KAUFMANN.
THRASHING AND SEPARATING MACHINE.
No. 266,371. Patented Oct. 24, 1882.
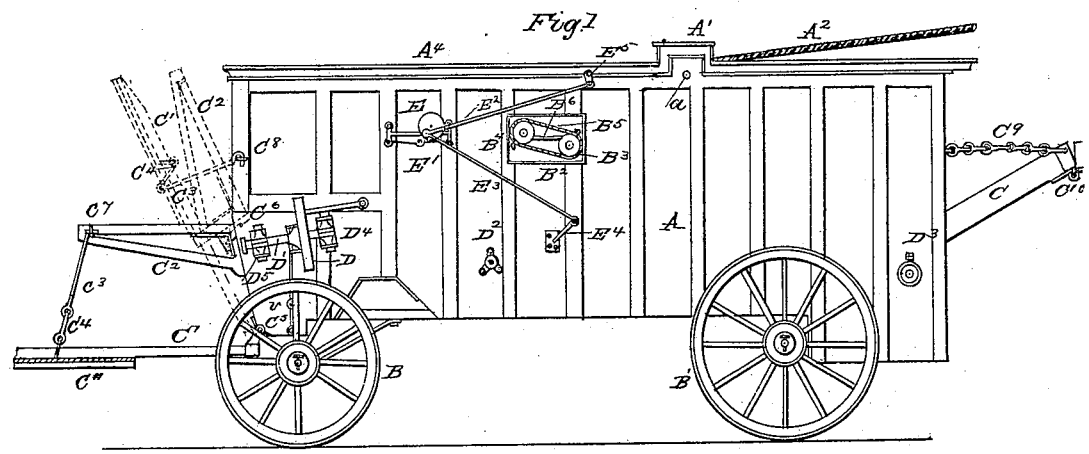
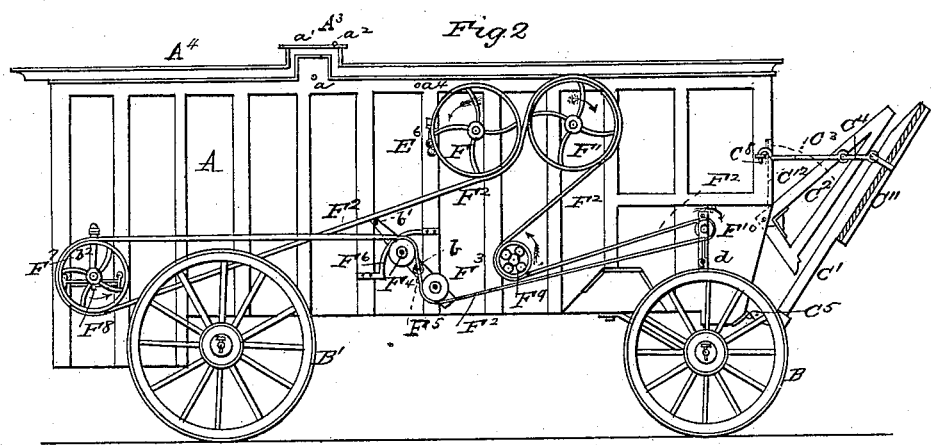
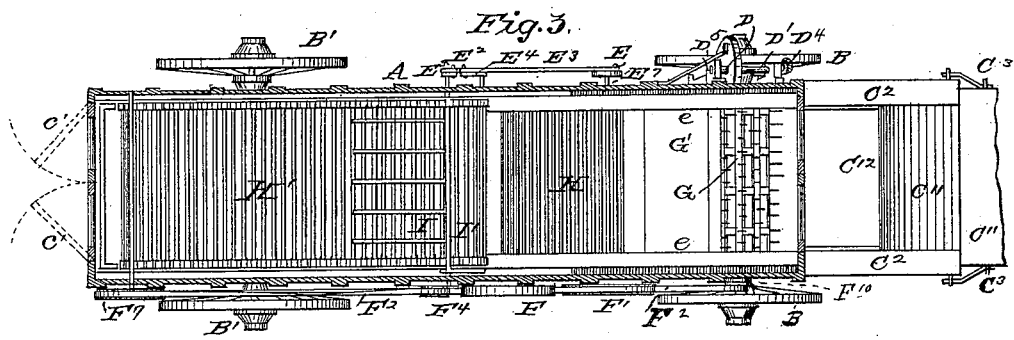
WITNESSES:
Fred. G. Dieterich
J. G. Hinkel
INVENTOR.
Peter Kaufmann
By D. C. Allen
ATTORNEY.

(No Model.) 5 Sheets—Sheet 2.
P. KAUFMANN.
THRASHING AND SEPARATING MACHINE.
No. 266,371. Patented Oct. 24, 1882.
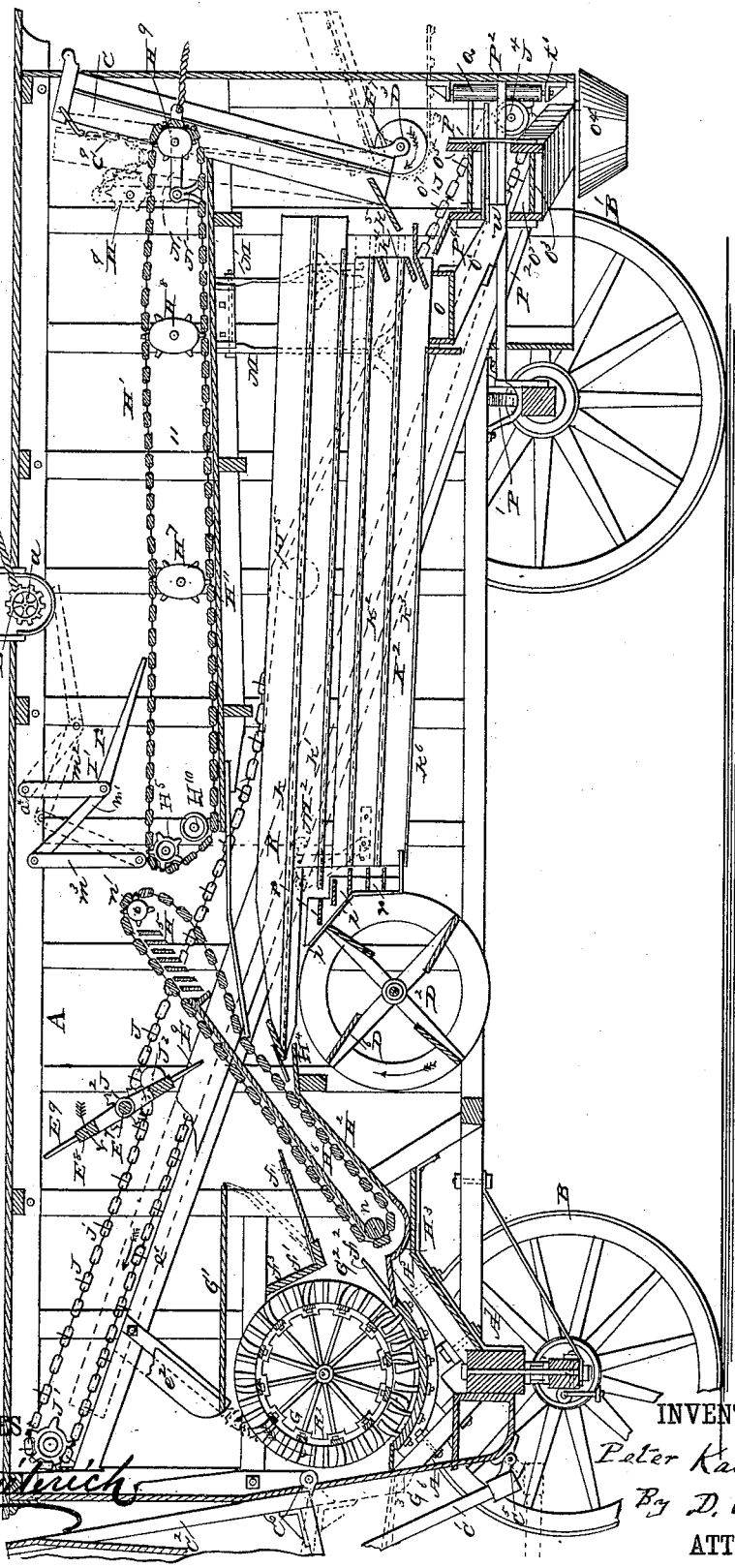
WITNESSES
INVENTOR.
Peter Kaufmann
By D. C. Allen
ATTORNEY.

(No Model.) 5 Sheets—Sheet 3.
P. KAUFMANN.
THRASHING AND SEPARATING MACHINE.
No. 266,371. Patented Oct. 24, 1882.
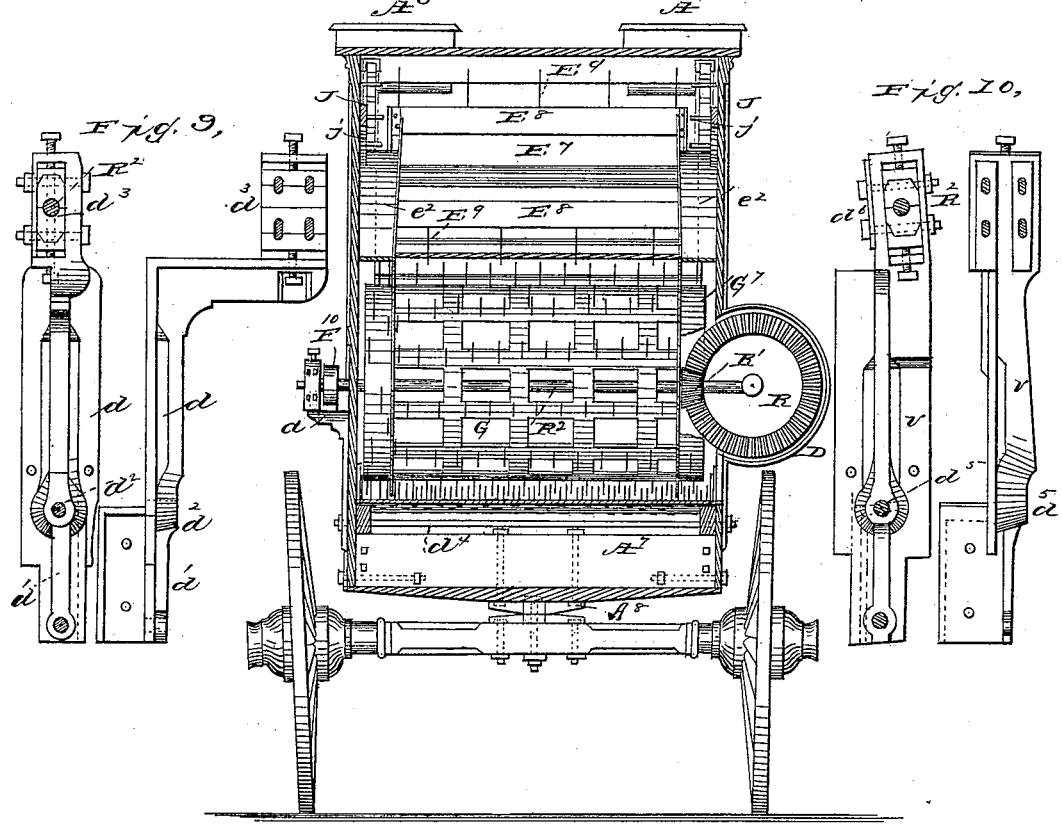
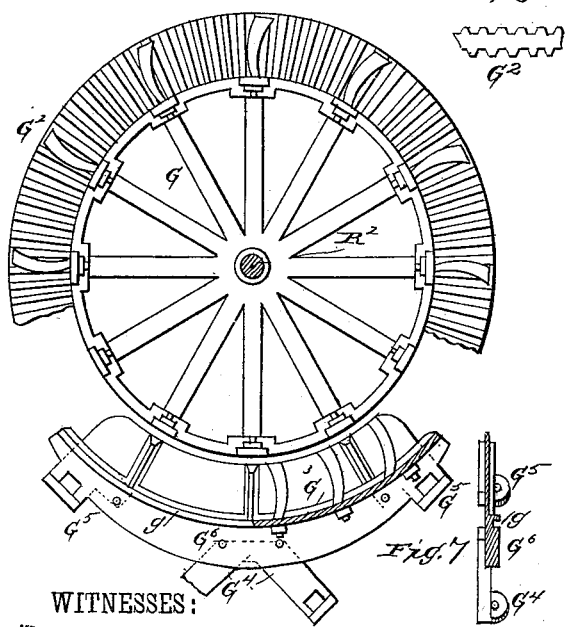
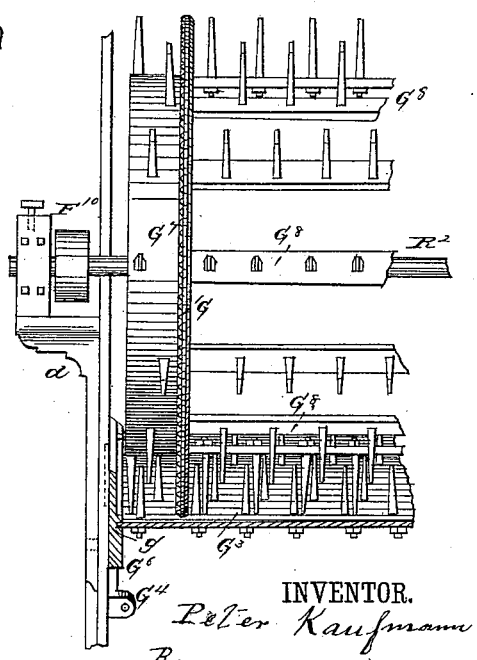
WITNESSES:
Fred. G. Dieterich
J. G. Hinkel
INVENTOR.
Peter Kaufmann
By D. C. Allen
ATTORNEY

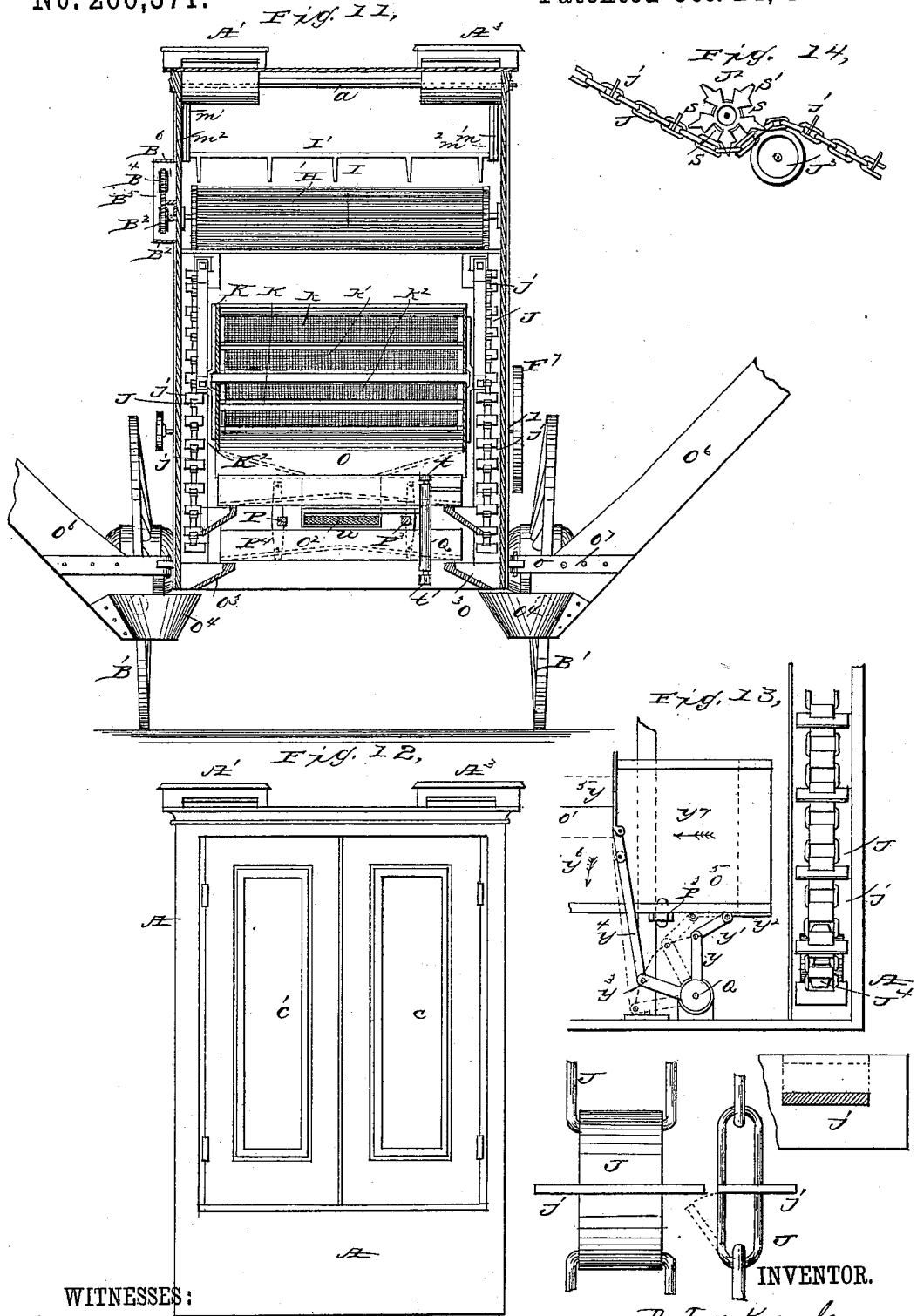

(No Model.) 5 Sheets—Sheet 5.
P. KAUFMANN.
THRASHING AND SEPARATING MACHINE.
No. 266,371. Patented Oct. 24, 1882.
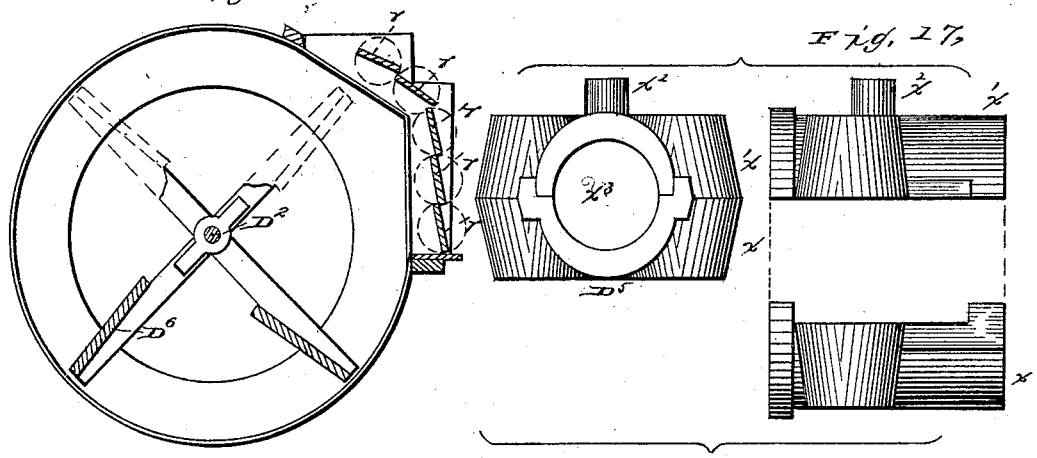
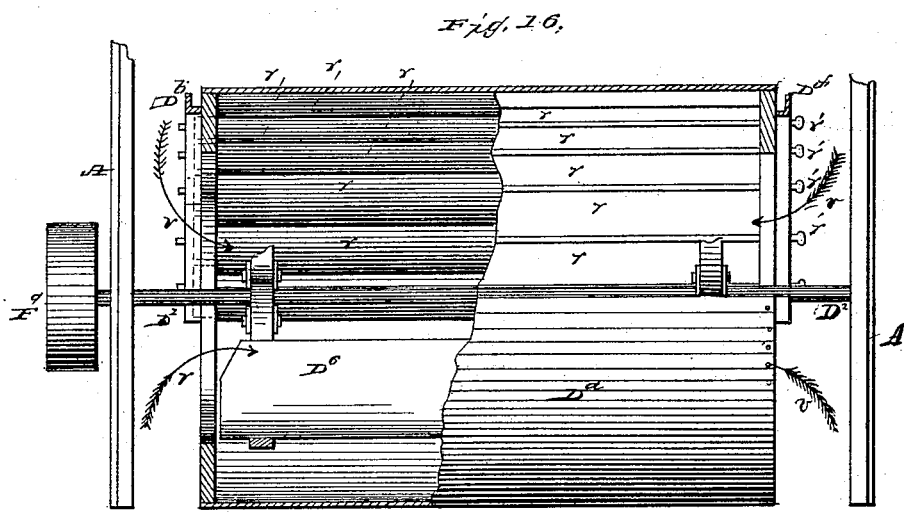
WITNESSES:
Fred. G. Dieterich
J. G. Hinkel
INVENTOR.
Peter Kaufmann
By D. C. Allen
ATTORNEY.

UNITED STATES PATENT OFFICE.

PETER KAUFMANN, OF NORMAL, McLEAN COUNTY, ILLINOIS.

THRASHING AND SEPARATING MACHINE.

SPECIFICATION forming part of Letters Patent No. 266,371, dated October 24, 1882.

Application filed December 21, 1880. (No model.)

*To all whom it may concern:*

Be it known that I, PETER KAUFMANN, a citizen of the United States, residing in Normal township, in the county of McLean and State of Illinois, have invented certain new and useful Improvements in Thrashing and Separating Machines, of which the following is a specification.

This invention relates to certain new and useful improvements in the class of thrashing and separating machines; and the invention consists in novel features of construction and combination and arrangement of parts, all as will be hereinafter fully described, and set forth in the claims hereto annexed, reference being had to the accompanying drawings, forming a part of this specification, in which—

Figure 1 is a side elevation of the entire machine. Fig. 2 is an elevation of the opposite side of the machine from that shown in Fig. 1. Fig. 3 is a top view of the same with the top of the machine-case removed. Fig. 4 is a vertical longitudinal section of the machine. Fig. 5 is a cross-section of the machine, taken in front of the cylinder. Fig. 6 is an end view of the cylinder, showing one corrugated flange partially in section and the concave floor below the cylinder. Fig. 6ª is an edge view of a section of the corrugated flange. Fig. 7 is an edge view of the concave floor for the cylinder. Fig. 8 is an elevation of one end of the cylinder, showing also a section of a portion of the concave floor and an edge view of the corrugated flange near the end of the cylinder. Fig. 9 represents a face and side view of the bracket-box in which one end of the cylinder-shaft operates. Fig. 10 is a face and side view of the bracket-box in which the other end of the cylinder-shaft operates. Fig. 11 represents an elevation of the rear end of the machine with the rear doors removed. Fig. 12 is an elevation of the rear end of the machine with the doors closed. Fig. 13 is a detached section, showing a plan view of a portion of the rear end of the machine and a portion of the elevator-chain in detail. Fig. 14 is a side view of a portion of the elevator-chain and its operating mechanism. Fig. 15 is an end view of the fan. Fig. 16 is a top view of the fan, partially in section. Fig. 17 represents detail views of the box used for supporting the power and other shafts, and the operating-gear for the cylinder. Fig. 18 represents detail views of the bracket-boxes for supporting the upper shaft of the grain-carrier and the front shaft of the straw-carrier.

The same letters refer to the same or corresponding parts throughout the several views.

A A represent the sides of the machine; $A^4$ the top, the top and sides paneled. The front end of the machine is provided with a hinged frame, $C'$, on which is secured the platform or foot-board $C^{11}$. The frame $C'$ is hinged at $C^5$ to the lower front part of the sides A A in such manner as to fold up or down, as shown in Figs. 1, 2, and 4.

Above the platform-frame $C'$ is another frame, $C^2$, which has a hinged feed-table, $C^{12}$, on top. This frame $C^2$ also is hinged to the sides A A by the pivot-bolts $C^6$, as shown in Figs. 1 and 2. The outer ends of the lower frame, $C'$, and the upper-feed-table frame, $C^2$, are united together by the links $C^3$ $C^4$. The rear end of the upper-feed-table frame, $C^2$, rests against the ends of the sides A A when the frame is folded down, as shown in Fig. 1. When in this position the link $C^3$, the upper end of which is provided with a hook, is hooked into the eyebolt $C^7$, and thus the lower frame, $C'$, is supported in a horizontal position, as shown in Fig. 1. When it is desired to fold the frames $C'$ and $C^2$ up the link $C^3$ is unhooked from the eyebolt $C^7$ and the frames tilted up. The link $C^3$ is then hooked into the eyebolts $C^8$ in the sides A A, as shown in Fig. 2.

The feed-table $C^{12}$ is hinged or pivoted to the sides of the frame $C^2$, and when said frame is elevated, as in Fig. 2, the feed-table $C^{12}$ is folded up against the front end of the machine, thus closing up part of the end of the case, as shown by dotted lines in Fig. 2.

The cylinder G, which is of the ordinary pattern, is provided at each end with a band, $G^7$, which bands are secured firmly to the bars $G^8$. The inner edge of each band $G^7$ is provided with a corrugated flange, $G^2$. These flanges $G^2$ divide the cylinder into three parts—i. e., the middle part between the flanges for thrashing off the straw and the outer parts between the flanges and sides A A of the machine for treating the tailings, as will be hereinafter described. The cylinder G is mounted on the shaft R², and the shaft is mounted in the bearings d³ of the bracket d and d⁶ of the bracket v. These brackets are shown in detail in Figs. 9 and 10.

The upper end of the bracket d projects sidewise from the side A of the machine far enough to permit the pulley F¹⁰ to revolve freely in the space, as shown in Figs. 5 and 8. These brackets d and v are securely bolted to the sides A A of the machine, and their lower ends are firmly bolted to the concave floor brackets G⁶. These concave floor brackets G⁶ are also secured to the sides A A and frame-timbers A⁵ A⁶, and each bracket is provided with a curved groove, g, for receiving and holding the floor G³, as shown in Figs. 6, 7, 8, and 4. Below the concave floor G³, and between it and the bolster-plate A⁸, is a heavy piece of timber, A⁷, the ends of which are firmly secured to the lower ends of the brackets d and v and sides A A of the machine, and thus form a strong supporting-frame for the cylinder G and prevent the cylinder-shaft R² from getting out of line with its boxes.

The cylinder-shaft R² is provided with a bevel-pinion, R', which is keyed fast to the shaft a short distance inside of the end of the cylinder, as shown in Fig. 5. The bevel-wheel R works in gear with the pinion R'. The wheel R is mounted on the shaft D', and said shaft is mounted in the boxes D⁴ D⁵, which are secured to the side of the machine, as shown in Fig. 1. The wheel R is also incased in the cover D, as shown in Figs. 1 and 5.

A short distance in the rear of the cylinder G the fan D⁶ is located, as shown in Fig. 4. The fan-case D², Figs. 15 and 16, is closed all around, except at the rear side, which is open and provided with a series of adjustable slats, r. The ends of these slats r are journaled in the castings D b and D f, with knobs r' at one end for the purpose of turning the slats into any desired position. In Fig. 18 the left-hand side of the slats are represented as closed, while the right-hand side shows the slats open to permit air to pass through the spaces i, Fig. 4, underneath the shaking-screens k k' k² k³.

The upper front part of the shoe K and the floor in front of the screen k passes over the fan to a point in front of the center of the fan, and the front ends of the screens k and k' of said shoe stop in front of the fan opposite the slats r. The front end of the shoe K is beveled underneath and operates over the horizontal projection H⁴ of the floor H² of the grain-carrier belt H, as shown in Fig. 2. The rear end of the shoe K is secured to the spring-hangers M', so as to allow the shoe to vibrate forward and backward.

Below the shoe K is another shoe, K', having two screens, k² above and k³ below. The front ends of both screen-shoes K and K' are pivoted on a rocker-bar, M², which bar has a pivot-stud extending through the side of the machine, with a crank, E⁴, outside, which is operated by the rod E³ and crank-wheel E.

The rear end of the lower shoe, K', is supported in the spring-hangers M, as shown in Fig. 4.

The rear ends of the screens k k' discharge any straw and chaff that may pass over them onto the stacker C, and the rear ends of the lower screens, k² k³, do not project so far as those of the screens above, and are each provided with springs near the ends, with inclined return-boards k⁴ k⁵ below, for the purpose of preventing grain from going over the ends of the screens, and to conduct the grain which passes through the openings into the spout O below. The spout O and its discharge-pipe O' are made fast to the lower shoe, K'. The lower end of the pipe O' discharges the grain which passes through it into the cross shaking-spout O².

Above the spout O² is another spout O⁵, likewise a cross-spout, designed to catch any grain which may fall from the stacker or pass over the ends of the screens k k' k² k³. These two cross shaking spouts are secured together by the pivoted rocker-bars P³ P⁴ at each end. These rocker-bars are made fast to the square shafts P, which shafts operate in suitable bearings, P', at one end and, P², at the other end.

The shafts P, the rocker-bars P³ P⁴, and the spouts O⁵ O² are operated by the spout O', through the medium of the rod y⁴, arm y³, vertical rocker-shaft Q, arm y, and link y', as shown in Fig. 13. Thus one end of the rod y⁴ is made fast to the spout O', the other end of the rod y⁴ is pivoted to the arm y³ of the vertical rocker Q, the upper and lower ends of said rocker Q are pivoted in the brackets t t', Fig. 4. The arm y of the rocker Q is pivoted to the link y', and the link y' is pivoted to the side plate, y², of the cross shaking-spout O⁵. Thus when the pipe O' moves in the direction of the arrow y⁶, Fig. 13, the spout O⁵ is moved at right angles thereto in the direction of the arrow y⁷, which motion is reversed as the pipe O' moves in the opposite direction. As the spout O⁵ moves in either direction the lower spout, O², moves in an opposite direction by reason of the rocker-bars P³ P⁴.

The grain-carrier belt H is of the ordinary construction of the slat pattern, and passes around a bar, n, below the bottom of the floor H⁶, close to the lower rear side of the cylinder G. The belt H receives its motion from the spur-wheel n' on the shaft of the wheel F, and the belt is of the same width as the space between the corrugated flanges G² of the cylinder G.

The upper inclined floor, H⁶, of the grain-carrier belt H extends from the bar n to a point above the side conveyer-boxes, e', and above that point, as far as the spur-wheel n', the floor H⁶ is provided with a series of slats, H⁵, having vertical openings between them to permit any loose grain carried up by the belt H to drop through said openings and through the spaces between the slats of the belt on the lower side onto the front end of the screen k of the shoe K. The lower inclined floor, H², of the belt H is connected with the concave floor G³ of the cylinder G by the curved part H³, and the upper end of the floor H² is provided with the horizontal part H⁴, which projects backward under the beveled end of the shoe K above the fan. The rear side of the concave floor G³ of the cylinder is provided with a series of rearwardly-projecting inclined fingers or prongs, f², for the purpose of guiding the straw onto the belt H.

Above the discharge-opening of the cylinder is a cross-bar, f³, to the lower end of which, at f', is hinged the deflector f, which is of the ordinary kind. The front end of the straw-carrier belt H' is mounted on the spur-wheel driver H⁵ with the roller H¹⁰ below. The lower side of the belt H' slides on the floor H¹¹. At the rear end the belt H' passes around the spur-wheel H⁹. The upper side of the belt is supported by the two beaters H⁷ H⁸, as shown in Fig. 4. The spur-wheels H⁹, at the rear end of the belt H', are mounted on the outer ends of the arms N, and the inner ends of said arms are pivoted to the brackets N', for the purpose of allowing the rear end of the belt H' to be folded up, as shown in dotted lines in Fig. 4, where the lower section, C, of the stacker is folded inside of the end of the machine.

Above the front end of the belt H', and operated by the shaft a⁴, is a straw-pitching mechanism consisting of the shaft a⁴, to which, at each end, on the inside of the casing A A, is secured the arms m². The lower ends of these arms are pivoted to the fork-shaft I'. The fork-shaft has inclined fingers or prongs, I, projecting backward, and at each end of the shaft I are the inclined arms m'. The upper ends of these arms m' are pivoted to the upper ends of the links m³, and the lower ends of the links m³ are pivoted to the sides A of the machine. The shaft a⁴ extends through the side of the machine, and one end is provided with the crank E⁵, and the whole pitching apparatus is operated by rod E², which is connected with the crank E⁵ of the shaft a⁴ and the crank-wheel E on the end of the beater-shaft E⁷.

The pivot-stud of the bar M² of the shoes K K' extends through the side of the machine, and is provided with a crank, E⁴. This crank is connected with the crank-wheel E of the beater-shaft E⁷, and when the machine is in operation causes the shoes K K' to vibrate longitudinally, the upper shoe, K, moving back while the lower shoe, K', moves forward, and vice versa.

The straw-stacker C is made of two sections. The lower one is pivoted to the sides A A at D³, and the lower section, C, is short enough to fold inside of the end of the machine, and is supported when down by the side chains, C⁹. The outer section, C¹⁰, of the stacker is raised and lowered by the rope A², which has one end attached at or near the outer end of the stacker, and the other end is made fast to the windlass-shaft a in the boxes A' above the machine. The outer section of the stacker is raised gradually as the height of the stack increases, without raising the section C; but when the hinged ends of the sections C and C¹⁰ are brought together, then both sections may be raised at the same time.

The beater E⁸ is of the ordinary kind, and is mounted on the shaft E⁷, said shaft having on one of its outer ends the pulley F', and on the other end the crank-wheel E, and on the inside of the case A, at each end of the beater, the shaft is provided with spur-wheels J². (Shown more fully in Fig. 14.) The wheel J² has spurs s' to engage with the links of the chain J, and is further provided with notches s for the flights j of the conveyer-chain to enter. The upper end of the conveyer-chain J operates on the spur-wheel J', and every third flat link of the chain is provided with a thin flat iron flight, j. (Shown fully in Figs. 13 and 14.) The lower side of the chain J operates in the inclined conveyer-boxes e' at the sides of the machine inside from the lower rear end of the machine to the front upper end. The upper part of the chain J, after leaving the spur-wheel J', passes under the wheel J² of the beater E⁸, and over the roller J³, thence diagonally downward over the roller J⁵, thence to the lower rear corner of the machine, where it passes over the spur-wheel J⁴, as shown in Fig. 4. These conveyer-chains are used for conveying the tailings to the front of the machine and discharging them through the spouts e² onto the cylinder G, between the corrugated flanges G² and sides of the machine-case, where the tailings receive a second treatment, and are then thrown by the cylinder onto the grain-carrier belt at the sides of the straw to be re-elevated.

On the outside of the machine (Fig. 2) is shown the arrangement of pulleys for operating the machine. The pulley F operates the beater E⁸. The pulley F' operates the spur-wheel n' of the grain-carrier belt H. The pulley F⁷ operates the straw-stacker belts, as shown in dotted lines in Fig. 4. The pulley F⁹ operates the fan. The pulley F¹⁰ is the cylinder-pulley from which power is furnished to run all the rest of the machine. The pulleys F³ F⁴ are tightener-pulleys, arranged on the bar F⁵. This bar is pivoted to the machine at b, and its upper arm operates in the rack F⁶, and has a handle, b', at its upper end.

The main belt F² passes over the cylinder-pulley F¹⁰, under the fan-pulley F⁹, and part way around it, thence around the pulley F' and partly around the beater-pulley F, thence with a twist around the straw-stacker pulley F⁷, thence over and under the tightener-pulleys F⁴ F³, thence back to the cylinder-pulley F¹⁰. Thus the one belt operates the entire machine except the cylinder.

On the opposite side of the machine, as shown in Fig. 1, the upper grain-carrier belt-shaft is provided with a belt-wheel, B⁴, and the front shaft of the straw-carrier belt is also provided with a corresponding belt-wheel, B³. Power is communicated from belt-wheel B³ to the wheel B⁴ by the chain B⁵, and the chain B⁵ and both wheels B³ B⁴ are inclosed in the box B².

The grain-elevating apparatus is partially shown in Fig. 11, Sheet 4.

The rear end of the machine, at each side of the bottom, is provided with elevator-boots O⁴ O⁴, into which the grain is discharged from the spout O³. The boot O⁴, Fig. 11, is provided with an elevator-leg, O⁶, which has its lower end hinged at $o$ to the side of the machine.

In operating my improved machine power is applied to the shaft D′ from any ordinary horse-power. The bevel-wheel R operates the wheel R′ and rotates the cylinder G, the main belt F operating all other parts of the machine, as before described. The grain to be thrashed is fed to the cylinder from the feed-table C¹², and the straw thrashed off by the central part of the cylinder between the flanges G². The thrashed grain and straw are then elevated by the grain-belt H and the grain falls through between the slats H⁵, and that which passes over the upper end of the carrier is deposited on the upper screen, $k$, of the shoe K, for separation from the chaff and fine straw. The elevated straw passes onto the straw-carrier H′ and is conveyed to the rear end of the machine and deposited on the stacker. While the straw is passing out of the machine the pitching device above the carrier-belt H′ is operated—that is, the forks I on their backstroke are moved backward and upward, thus pitching the straw and releasing any grain held thereby, as shown by dotted lines in Fig. 4. On the forward stroke of the pitcher the forks I are moved downward and forward in the position, also shown in Fig. 4, ready to again move backward and upward and pitch more straw. The grain which falls on the screen $k$ falls through onto the finer screen $k'$ below, where it receives a current of air from the fan through the space $i$ at the top between the upper slat, $r$, and front floor of the screen $k$. This current of air blows away the chaff and the grain is shaken along the oat riddle or screen $k'$, and the grain is deposited onto the wheat riddle or screen $k^2$ of the shoe K′ below. Here the wheat again passes through a current of air through the space $i$ between the top slat and the slat below it, and as the grain is sifted through the wheat riddle $k^2$ it falls onto the seed riddle or screen $k^3$. Here it again encounters another current of air from the fan through the corresponding space $i$ between the slats, and as the seed-screen $k^3$ is very fine no wheat passes through it, but is shaken along to the rear end, where it falls into the spout O and through the pipe O′ into the cross-spout O². Here the grain is conducted into the boot of the elevator and measuring device, elevated, and measured. Any light stuff, chaff, or tailings which may pass over the ends of the screens $k$ $k'$ $k^2$ falls into the cross-spout O⁵, and is conducted to the base of the machine into the lower end of the conveyer-box $c'$. The chain J conveys the tailings upward and forward, and they are delivered through the spouts $e^2$ onto the ends of the cylinder G, between the flanges G² and sides of the machine for retreatment.

If oats are treated, the main portion of the oats will pass through the hole at the rear end of the screen $k^2$, while the finer oats may pass through the screen $k^2$ onto the screen $k^3$, this screen being fine enough to prevent the oats from passing onto the seed-riddle. Consequently any oats, whether on the screen $k^2$ or $k^3$, must go to the spout O. When timothy or clover seed is thrashed, the seed, which passes through all of the screens, falls on the floor $k^6$, and is deposited, like other grain, into the spout O. All of these different separations are performed without altering the screens and shaking-shoes or shaking-spouts at the rear end of the machine. When clover is to be separated, the tailings are repeatedly carried forward to the cylinder until the seed is removed from the hull.

In separating wheat and oats it is necessary to use only one of the conveyers J for carrying the tailings back to the cylinder; and in order to use one conveyer a loose board, O⁷, is placed in one-half of the cross-spout O⁵, so as to throw the tailings into one conveyer-box. A like board, O³, is also employed in like manner in the cross-spout O² to convey all the separated grain into one boot, O⁴, of the elevator-leg; but when it is desired to use both conveyers, the board O⁷ is dispensed with, and when the elevator and measurer is used on either side of the machine, then the board O³ is changed from one side of the spout to the other, as the case may require.

What I claim as new, and desire to secure by Letters Patent, is—

1. In a thrasher and separator, the combination, with the thrashing cylinder and concave, of the hinged frame C′, the platform or foot-board C¹¹, the frame C², hinged feed-table C¹², and mechanism for securing them in a lowered or elevated position, substantially as and for the purpose specified.

2. In a thrasher and separator, the combination, with the thrashing cylinder and concave, of the hinged frames C′ C², connecting-links C³ C⁴, stationary and hinged floors C¹¹ C¹², and mechanism for securing said floors in a lowered or elevated position, substantially as and for the purpose specified.

3. In a thrasher and separator, the combination of the machine-casing, tailings-conveyers arranged upon opposite sides of the machine-casing and inside thereof, and a thrashing cylinder constructed with the bands at each end and the flanges arranged a short distance from the ends of said cylinder, substantially as and for the purpose specified.

4. In a thrasher and separator, the combination of the machine-casing, tailings-conveyers arranged upon opposite sides of the machine-casing and inside thereof, and a thrashing-cylinder constructed with the bands at each end, and the corrugated flanges arranged a short distance from the ends of said cylinder, substantially as and for the purpose specified.

5. In a thrasher and separator, the combination, with the concave bottom, of the brackets $G^6$, provided with the angular arms $G^4$ $G^5$, and the frame-timbers $A^5$ $A^6$, meeting each other at an angle, substantially as and for the purpose specified.

6. In a thrasher and separator, the combination of the bracket $d$, constructed with bearing-boxes, $d^3$, extended lower part, $d'$, and bolt-holes, $d^2$, the cylinder-shaft $R^2$, bracket V, constructed with boxes, $d^6$, extended lower portion, and bolt-holes, $d^5$, the concave floor, and the cross-rod $d^4$, substantially as and for the purpose specified.

7. In a thrasher and separator, the combination of the cylinder-extension $C^7$, cylinder-shaft $R^2$, cylinder G, pinion $R'$ on cylinder-shaft $R^2$, inside of the extension $G^7$, the wheel R, projecting through the machine-case A and meshing in gear with pinion $R'$, inside of the cylinder-extension $G^7$, and a suitable shield for said gearing connected to the machine-case, substantially as and for the purpose specified.

8. In a thrasher and separator, the combination, with the cylinder G, constructed as described, and journal-boxes $d^3$ $d^6$, of bracket-bearings $d$ and $v$, having on their upper ends projections and the set-screws, to prevent the boxes $d^3$ $d^6$ from slipping, as shown and described.

9. In a thrasher and separator, the combination, with the cylinder and concave, the timber base $A^7$, and bracket-bearings $d$ $v$, of the cylinder-boxes $d^3$ $d^6$, bolted laterally thereto, supporting set-screws for said boxes, the concave brackets $G^6$, formed with projecting bolt-arms $G^4$ $G^5$, and frame-timbers $A^5$ $A^6$, secured to brackets $d$ and $v$, forming a combined frame-support for the cylinder and concave, substantially as herein shown and described.

10. In a thrasher and separator, the combination of the casing, two inside elevators, inside frame-timbers, $e$ $e'$ and $A^5$ $A^5$, flanges $G^2$, the cylinder and concave arranged with their ends in the space between the elevators, bands $G^7$, grain and straw carriers H and $H'$, and the two shoes K and $K^2$, all arranged and constructed substantially as herein shown and described.

11. In a thrasher and separator, the combination, with the grain belt or carrier $H'$ and the top shoe, K, of the floor $H^2$, of the grain belt or carrier, said floor having the horizontal part $H^4$, extending backward under the front end of said top shoe, substantially as specified.

12. In a thrasher and separator, the combination of the endless straw-carrier $H'$, sprocket-driver $H^5$, and oval sprocket-chain beaters $H^7$, $H^8$, and $H^9$, the top chains being alternately accelerated and retarded by means of the oval sprocket beater or wheel $H^9$, in rear of the sprocket-driver $H^5$, whereby the upper carrier, $H'$, becomes stretched and slacked twice with each revolution of the oval sprocket beater or wheel $H^9$, substantially as and for the purpose herein shown and described.

13. In a thrasher and separator, the combination, with the concave floor $G^3$ and shoe K, of carrier-belt H, the floor $H^6$, arranged inside of said carrier, and constructed with a series of slats, $H^5$, with openings between them, the bottom floor, $H^2$, having its lower curved end connected with the concave floor $G^3$, and its upper end projecting backward under said shoe K, substantially as and for the purpose specified.

14. In a thrasher and separator, the thrashing-cylinder G, constructed with the bands $G^7$ at each end thereof, and the flanges $G^2$, arranged near the ends thereof and corrugated upon their opposite sides, in combination with a toothed concave extending the entire width of the machine, substantially as and for the purpose specified.

15. In a thrasher and separator, the combination, with the cylinder G, the concave floor $G^3$, brackets $G^6$, having angular projecting bolt-arms, and the brackets for connecting and supporting the cylinder and concave, substantially as and for the purpose specified.

16. In a thrasher and separator, in combination with the cylinder G, the concave floor $G^3$, brackets $G^6$, the timber base $A^7$, and the bracket-bearings $d$ and $v$, forming a frame support for the cylinder, substantially as and for the purpose herein shown and specified.

17. In a thrasher and separator, the combination of the casing, the thrashing-cylinder, the stationary inside inclined conveyer-boxes $e'$, extending from the lower rear end to the upper front end of the machine, and the carrier-belts, the upper ends of said boxes being provided with spouts $e^2$, for discharging the tailings onto the ends of the cylinder, as herein shown and described.

18. In a thrasher and separator, the elevator mechanism consisting of the endless chains, the open-spoked sprocket-wheels, and guide sheave-wheels, the sprockets of the wheels $J^2$ extending through the chain a short distance into the guide sheave-wheels $J^3$, and the projections $j$ on the chains adapted to extend toward the hub of each wheel $J^2$ in between the sprockets in the openings $s$, substantially as and for the purpose specified.

19. In a thrasher and separator, the elevator-chains provided with projections $j$ at suitable intervals, in combination with the open-spoked sprocket-wheels, the beater and crank shaft $E^7$, the guide sheave-wheels $J^3$, and stud-bearings for said wheels fastened to the machine-case, substantially as herein shown and described.

20. In a thrasher and separator, the combination of the beater and crank shaft $E^7$, means for actuating the same, and sprocket-wheels mounted on said shaft for the actuation of the elevator-chains, whereby motion is communicated to the elevator-chains J, substantially as herein shown and described.

21. In a thrasher and separator, the combination of the machine-casing, the conductors $e^2$, extending to the front end of the machine-casing A, the cylinder flanged heads $G^2$, and extensions $G^7$, the machine-casing forming the outsides of the conductors $e^2$, substantially as herein shown and described.

22. In a thrasher and separator, the combination, with the thrashing-cylinder, concave $G^3$, and shoe K, of carrier-belt H, and the bottom floor, $H^2$, having its lower curved end connected with the concave $G^3$, and the upper end of said concave projecting backward under said shoe K, substantially as and for the purpose specified.

23. In a thrasher and separator, the combination, with the straw-carrier H, of the straw-pitching device consisting of the forks I, the shaft I', the arms $m'$, and links $m^2$ $m^3$, as and for the purpose specified.

24. In a thrasher and separator, the combination, with the straw-carrier H, of the straw-pitching device consisting of the forks I and the shaft I', the arm $m$ and links $m^2$ and $m^3$, the shaft $a^4$, with crank $E^5$, the rod $E^2$, and crank-wheel E, the several parts arranged to operate substantially in the manner as herein shown and described.

25. In a thrasher and separator, the combination of the frame and casing thereof with the jointed stacker connected to the machine, and adapted to be folded inside of the casing thereof, substantially as herein shown and described.

26. In a thrasher and separator, the combination of the frame and casing thereof, of the jointed stacker connected to the machine and constructed with the adjustable section $C^{10}$, said jointed stacker adapted to be folded inside of the machine, as herein shown and described.

27. In a thrasher and separator, the combination, with the frame and casing thereof, of the jointed stacker connected with the machine, and constructed with the adjustable section $C^{10}$, said jointed stacker adapted to be folded inside of the machine, and a pair of doors, C C', adapted to close the end tightly when the machine is not in operation, and when opened to form side-boards to prevent the wind from blowing the straw in passing over the stacker, substantially as herein shown and described.

28. In a grain-separator, the combination of the longitudinal shaking-spouts $O^2$ $O^5$, the rocking bars $P^3$ $P^4$, the spouts O', the rod $y^4$, the arm $y^3$, the vertical rocking shaft Q, the arm $y$ and the link $y'$, substantially as shown and described.

29. In a grain-separator, the combination of the lower shoe, $K^2$, having two parallel floors, $K^3$ $K^6$, with a wind-space between them, collecting-spout O at the rear end of the floor $K^6$, formed with a center discharge, and inclined central spout, O', substantially as and for the purpose specified.

30. In a grain-separator, the grain-spout $O^2$ and tailings-spout $O^5$, in combination with the stacker and inclined central discharge-spout, O', the tailings-spout being above the latter and under the end of the section $c$ of the stacker, substantially as and for the purpose specified.

31. In a thrasher and separator, the combination of the casing, the adjustable stacker-frame pivoted within the casing, and the rear end of the straw-carrier H', adjustable to make room for the section of the stacker adapted to be folded inside of the casing, the straw-carrier H', and the upper end of the stacker being coupled together, substantially as and for the purpose described.

32. In a thrasher and separator, the combination, with the casing of the machine, of the hinged feed-table frame $C^2$, and the folding floor $C^{12}$, adapted to close the front end of the machine when not in operation, substantially as and for the purpose specified.

In testimony whereof I have signed my name to this specification in the presence of two subscribing witnesses.

PETER KAUFMANN.

Witnesses:
E. O. FRINK,
R. RICHTER.